United States Patent [19]

Donovan, Jr. et al.

[11] Patent Number: 4,465,252
[45] Date of Patent: Aug. 14, 1984

[54] COMPACT UNIVERSAL HANGER FOR TAILPIPES AND THE LIKE

[75] Inventors: Edmund D. Donovan, Jr.; Roy S. Florian, both of Southington, Conn.

[73] Assignee: Nickson Industries, Inc., Plainville, Conn.

[21] Appl. No.: 483,137

[22] Filed: Apr. 8, 1983

[51] Int. Cl.³ .............................................. E21F 17/02
[52] U.S. Cl. ........................................ 248/60; 248/589
[58] Field of Search ................. 248/59, 60, 58, 62, 248/63, 589; 180/309, 296

[56] References Cited

U.S. PATENT DOCUMENTS

| | | | |
|---|---|---|---|
| 2,549,346 | 4/1951 | Tormo | 248/58 |
| 2,743,895 | 5/1956 | Tygh | 248/341 |
| 4,004,768 | 1/1977 | Evans | 248/59 |

FOREIGN PATENT DOCUMENTS 585863  2/1947  United Kingdom ................. 248/58

Primary Examiner—J. Franklin Foss

[57] ABSTRACT

A compact, universal hanger for tailpipes and the like includes an L-shaped mounting bracket having a horizontal leg for mounting on the horizontal surface of a vehicle frame or the like and an aperture extending along the intersection of its legs. A pair of resiliently deflectable straps are pivotably mounted to the depending leg of the bracket, and the aperture in the horizontal leg provides clearance for free pivoting of the strap disposed thereunder. At the lower end of the strap is pivotably mounted a U-shaped support bracket, and pivotably secured to the web of the support bracket is a hanger bracket for supporting a pipe clamp.

8 Claims, 4 Drawing Figures

COMPACT UNIVERSAL HANGER FOR TAILPIPES AND THE LIKE

BACKGROUND OF THE INVENTION

Various types of pipe hangers are utilized for securing tailpipes and other exhaust system components to the frame of an automobile, or for securing other pipe elements to supporting structures. Where there is dynamic loading, it is desirable to include in such hangers resiliently deflectable elements such as rubber straps to absorb or accommodate such loading.

In Evans and Florian U.S. Pat. No. 4,004,768 granted on Jan. 25, 1977, there is described and claimed a highly advantageous universal tailpipe hanger providing a high degree of accommodation of dynamic loading, both on and off the centerline axis of the hanger. That hanger is constructed in a manner which is symmetrical about the centerline axis to provide a straight line transmission of forces in normal use and, accordingly, long lived and relatively trouble-free operation. The hangers of this patent have enjoyed substantial and widespread acceptance.

With the increasing number of smaller cars, there has developed a need for hangers of relatively compact size which can readily replace the original equipment hangers, most of which are of custom configuration. The commercial hanger illustrated in the aforementioned patent has generally been relatively long as sold, and installers have cut and bent the metal strap to permit mounting on a horizontal surface of the frame with relatively little vertical clearance.

It is an object of the present invention to provide a novel pipe hanger which requires relatively little vertical clearance from a horizontal support surface to the pipe carried thereby.

Another object is to provide a novel universal pipe hanger which may be utilized as a replacement unit for a number of different types of automobiles.

It is also an object to provide such a hanger which may be readily and relatively economically fabricated and which is rugged and long lived in use.

SUMMARY OF THE INVENTION

It has now been found that the foregoing and related objects can be readily attained in a hanger for tailpipes and the like, which includes a mounting bracket having a generally inverted L-shaped cross section with the horizontal leg having a multiplicity of spaced mounting apertures therethrough for securing the bracket to a vehicle frame or the like. The horizontal leg also has a strap aperture therethrough extending along the line of intersection with the depending vertical leg, and the vertical leg has a pivot aperture therethrough aligned with the strap aperture. A pair of resiliently deflectable strap members is disposed on opposite sides of the vertical leg and is pivotably supported thereon by pivot means extending through aligned apertures in the upper end portions thereof and the pivot aperture of the other leg. The upper ends of the strap members adjacent the angle bracket are of convexly arcuate configuration and extend at least to a point closely adjacent the plane defined by the lower surface of the horizontal leg. The straps also have aligned apertures therethrough adjacent the lower ends thereof.

Carried by the lower ends of the straps is a support bracket of generally U-shaped cross section having aligned apertures in its vertical legs aligned with the lower apertures of the straps, and pivot means extends through the aligned apertures of the support bracket legs and straps. Depending from the hanger bracket is hanger means adapted to provide pipe support means, and pivot means pivotably mounts the hanger means to the web of the support bracket. As a result, the support bracket will allow the hanger means to pivot about an axis lying in substantially the same plane as the vertical leg of the mounting bracket. The pivotal axes of the straps on the support and mounting brackets are substantially parallel during relative pivoting of those elements, and the arcuate upper ends of the strap below the horizontal leg may pivot freely in the clearance provided by the strap aperture.

In the preferred embodiment, the strap aperture is elongated in the direction of the intersection with the vertical leg and extends into the adjacent upper portion of the vertical leg. The hanger includes a spacer member between the lower end portions of the straps and has an aligned aperture therein through which the second mentioned pivot means extends. A pair of washers are disposed outwardly of the upper end portions of the straps, and the first mentioned pivot means extends therethrough. The upper ends of the vertical legs of the hanger bracket are convexly arcuate, and the lower ends of the straps are convexly arcuate and closely spaced to the web of the hanger bracket so as to provide clearance for pivoting of the several members of the assembly relative to each other while minimizing the overall length of the assembly.

DETAILED DESCRIPTION OF THE ILLUSTRATED EMBODIMENT

Figure 1:
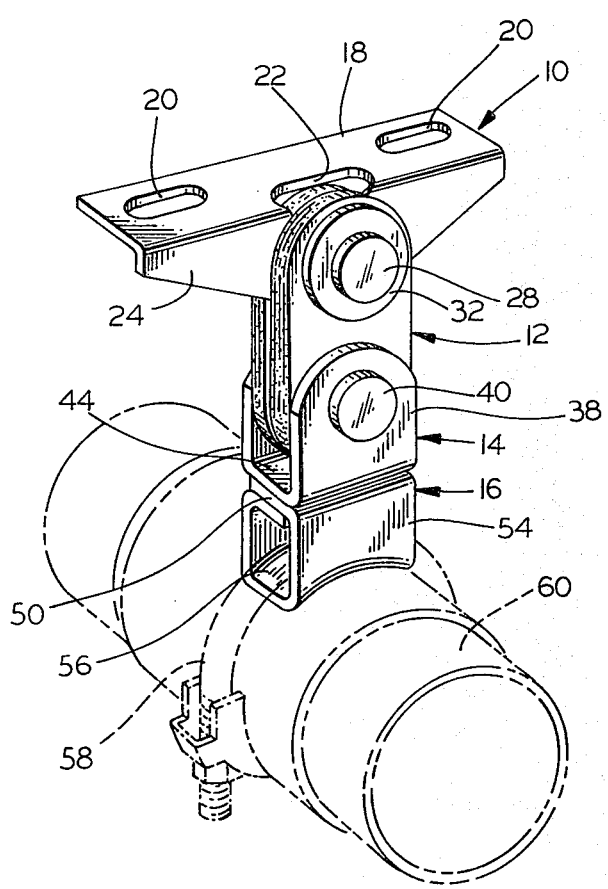
FIG. 1 is a perspective view of a hanger for tailpipes and the like embodying our invention and showing in phantom line a clamp and fragmentarily illustrated tailpipe as supported thereby.

Turning now in detail to the attached drawing, the novel pipe hanger of the present invention is generally comprised of an L-shaped mounting bracket generally designated by the numeral 10, a pair of straps pivotably mounted thereon at their upper end and generally designated by the numeral 12, a U-shaped support bracket pivotably mounted on the lower end of the straps 12 and generally designated by the numeral 14, and a hanger bracket pivotably mounted on the support bracket and generally designated by the numeral 16.

The mounting bracket 10 is of inverted L-shaped cross section and has an elongated, generally rectangular horizontal leg 18 with a pair of spaced, elongated apertures 10 adjacent its ends through which fasteners (not shown) may extend to secure the hanger to the frame of an automobile (not shown) or other supporting structure. An elongated strap aperture 22 is provided in the leg 18 and extends along the central portion of the line of intersection with the other or depending vertical leg 24, and preferably into the adjacent upper portion thereof. The depending leg 24 has converging lower edge surfaces to minimize the space requirements while ensuring sufficient strength and transfer of loading to the horizontal leg 18 and its mounting fasteners (not shown). Centrally of the vertical leg 24 is provided a pivot aperture 26 through which extends a first pivot member 28, which in the illustrated embodiment is a rivet.

The straps 12 are disposed on opposite surfaces of the vertical leg 24 and have pivot apertures 30 therein through which the pivot member 28 extends to provide the pivotal connection therewith. On the outer surfaces of the straps 12 are washers 32 against which the heated portions of the rivet 28 bear to facilitate pivotal movement and minimize wear. The upper ends of the straps 12 are convexly arcuate and extend at least to a point closely adjacent the plate defined by the adjacent or lower surface of the horizontal leg 18, and are aligned with the strap aperture 22 which provides clearance for the free pivoting of the strap 12 disposed below the leg 18. Adjacent the other or lower end thereof, the straps 12 have a second set of aligned pivot apertures 34 therein, and the lower ends of the straps 12 are also convexly arcuate.

Figure 2:
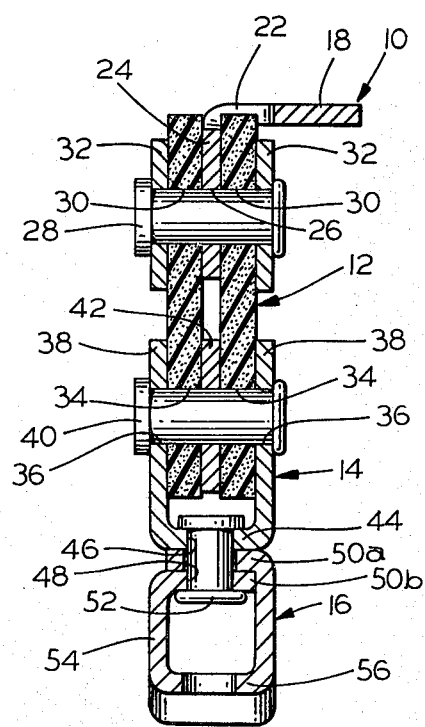
FIG. 2 is a vertical transverse sectional view thereof to an enlarged scale.

The support bracket 14 has aligned pivot apertures 36 in its upstanding vertical legs 38, and a second pivot member 40 (conveniently a rivet) extends through the apertures 36 and the strap apertures 34 to provide the pivotal connection therebetween. A washer 42 of substantially the same thickness as the stock of the mounting bracket 10 is disposed between the lower end portions of the straps 12 as a spacer. The upper or free ends of the legs 38 are convexly arcuate as best seen in FIG. 1. The horizontal web 44 of the bracket 14 is provided with a centrally disposed pivot aperture 46 as seen in FIG. 2.

The hanger 16 has a pivot aperture 48 in its upper horizontal wall portion 50 which is aligned with the aperture 46 in the web 44 of the bracket 14, and a third pivot member 52 extends through the aligned apertures 46,48 to provide the pivotal connection therebetween. In the illustrated embodiment, the hanger 16 is formed from a continuous strip of metal with overlapping upper horizontal wall portions 50a, 50b, sidewall portions 54, and a bottom wall portion 56. As seen, the bottom wall portion 56 has a generally convexly arcuate upper surface in the direction perpendicular to the axes of pivoting of the straps 12 so as to provide greater bearing surface for the bight of the clamp 58 which is seen in FIG. 1 as carrying the fragmentarily illustrated tailpipe 60.

Figure 3:
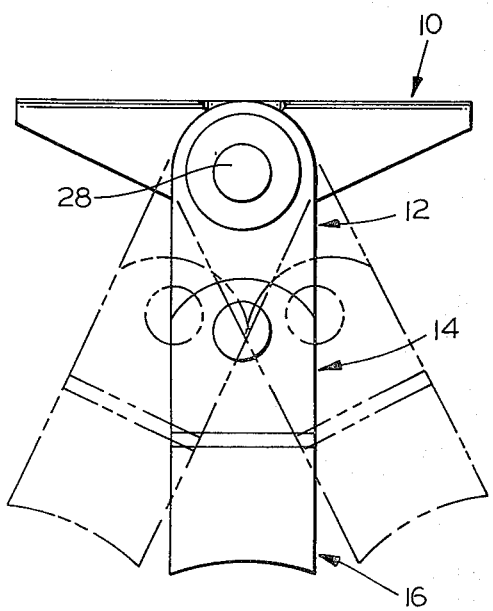
FIGS. 3 and 4 are partially diagrammatic side elevational views showing the elements of the assembly in several relatively pivoted positions.

As seen in FIGS. 1 and 3, the arcuate upper end of the straps 12 may (and preferably does) extend to a point approaching the plane of the upper surface of the horizontal leg 18 of the mounting bracket 10 and still pivot freely thereon by virtue of the strap aperture 22. Moreover, the convexly arcuate ends of the straps 12 minimize the spacing needed relative to adjacent surfaces to provide pivotal action while minimizing stress points and providing symmetry.

As in the case of the tailpipe hanger of the aforementioned U.S. Pat. No. 4,004,768, the forces generated by the tailipipe 58 are normally translated to the mounting bracket 10 along a longitudinally vertical axis extending through the pivots 52, 40 and 28.

The symmetrical disposition of the hanger component elements about the central longitudinal hanger axis ensures that the forces exerted by a suspended pipe act along a line coplanar with this axis. Thus, there are no forces resulting from an off-center line of action that would tend to snap off the rivet heads or weaken the strap members 12. Furthermore, the close spacing of the free ends of the bracket legs 38 and washers 28 prevents the strap members 12 from flexing to an excessive degree and snapping taut as the automobile encounters bumps, a process which would rapidly weaken the strap members 12.

Figure 4:
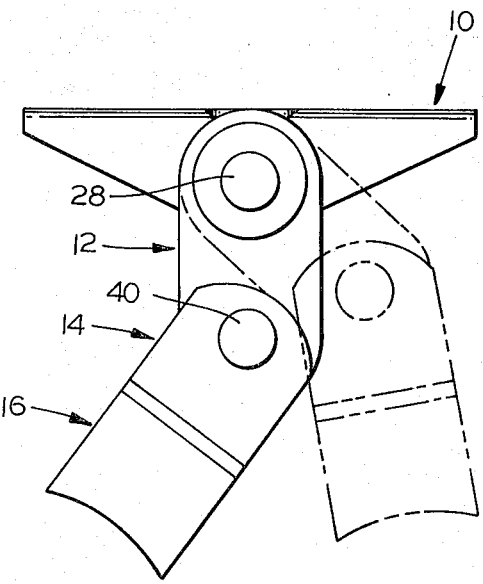

As seen in FIG. 4, the support bracket 14 may pivot on the straps 12 to accommodate sidewise movement of the tailpipe 60 or even the necessity for suspending the tailpipe 60 to one side of the vertical centerline of the hanger.

The strap members 12 are preferably of corded rubber to provide the desired sound and vibration absorption and strength, but may be of any material having comparable properties. Exemplary of a suitable strap material is that sold under the trademark TYCOR by A. Lakin and Sons, Inc. The remaining hanger components are preferably of steel or a suitable substitute. Although at least two such strap members must be used to provide the desired balance, in fact each strap member may be provided by a plurality of separate strap elements cooperating to ensure the desired strength.

The mounting bracket is formed of rigid metal stock, conveniently by stamping of sheet steel although it may also be formed by forging or extrusion followed by machining or other metal working technologies to provide the several apertures.

The hanger member 16 is preferably formed separately from the pipe clamp, although it may be integral therewith. Rivets are conveniently used to assemble the parts and provide the desired pivoting action, but bolts or other comparable fasteners which permit pivotal movement may be substituted therefor.

Thus, it can be seen that the present invention provides a novel compact pipe hanger which is rugged, economically fabricated, and easily adaptable for use with a range of motor vehicles or other support surfaces and which is adapted for mounting on a horizontal support surface. The force exerted on the pipe hanger by a suspended pipe extends along the center longitudinal line of the hanger to minimize the forces acting to shear the pivots and tear the straps.

Having thus described the invention, I claim:

1. In a hanger for tailpipes and the like, the combination comprising:

A. a mounting bracket having a generally inverted L-shaped cross section with the horizontal leg having a multiplicity of spaced mounting apertures therethrough for securing the bracket to a vehicle frame or the like and further having a strap aperture extending therethrough and along a substantial portion of the line of intersection with the depending vertical leg thereof, said vertical leg having a pivot aperture therethrough aligned with said strap aperture;

B. a pair of resiliently deflectable strap members on opposite sides of said vertical leg and pivotably supported thereon by pivot means extending through aligned apertures in the upper end portions thereof and said pivot aperture of said other leg, the ends of said strap members adjacent said angle bracket being of convexly arcuate configuration and extending at least to the plane defined by the lower surface of said horizontal leg, said straps also having aligned apertures therethrough adjacent the lower end thereof;

C. a support bracket of generally U-shaped cross section defined by vertical legs and a bottom web, said bracket having aligned apertures in its vertical legs aligned with said apertures of said straps adjacent said lower end thereof;

D. pivot means extending through said aligned apertures of said support bracket legs and straps;

E. hanger means depending from said hanger bracket and adapted to provide pipe support means;

F. pivot means pivotably mounting said hanger means to the web of said support bracket, whereby said support bracket will pivot said hanger means about an axis lying in substantially the same plane as said other leg of said mounting bracket and said pivotal axes of said straps on said support and mounting brackets are substantially parallel during pivoting of said elements relative to each other, and wherein the arcuate upper ends of said strap below said horizontal leg may pivot freely in the clearance provided by said strap aperture.

2. The hanger of claim 1 wherein said strap aperture is elongated in the direction of its line of intersection with said other leg and extends into the adjacent upper portion of said other leg.

3. The hanger of claim 1 wherein said hanger includes a spacer member between the lower end portions of said straps and having an aligned aperture therein through which said second mentioned pivot means extends.

4. The hanger of claim 1 wherein said hanger includes a pair of washers disposed outwardly of the upper end portion of said straps and through which said first mentioned pivot means extends.

5. The hanger of claim 1 wherein the upper ends of said legs of said hanger bracket are convexly arcuate and wherein the lower end of said straps is convexly arcuate and closely spaced to the web of said hanger bracket so as to provide clearance for pivoting of the several members of the assembly relative to each other while minimizing the overall length of the assembly.

6. In a hanger for tailpipes and the like, the combination comprising:

A. a mounting bracket of rigid metal stock having a generally inverted L-shaped cross section with the horizontal leg having a multiplicity of spaced mounting apertures therethrough for securing the bracket to a vehicle frame or the like and further having an elongated strap aperture extending therethrough and along a substantial portion of the line of intersection with the depending vertical leg thereof, said vertical leg having a pivot aperture therethrough aligned with said strap aperture;

B. a pair of resiliently deflectable strap members on opposite sides of said vertical leg and pivotably supported thereon by pivot means extending through aligned apertures in the upper end portions thereof and said pivot aperture of said other leg, the ends of said strap members adjacent said angle bracket being of convexly arcuate configuration and extending at least to a point above the plane defined by the lower surface of said horizontal leg with the strap disposed below said horizontal leg having its upper end disposed in said elongated aperture, said straps also having aligned apertures therethrough adjacent the lower end thereof;

C. a support bracket at the lower end of said straps;

D. pivot means extending through said aligned apertures of said support bracket and apertures of said straps;

E. hanger means depending from said hanger bracket and adapted to provide pipe support means;

F. pivot means pivotably mounting said hanger means to said support bracket.

7. The hanger of claim 6 wherein said strap aperture extends into the adjacent upper portion of said other leg.

8. The hanger of claim 6 wherein said hanger includes a pair of washers disposed outwardly of the upper end portion of said straps and through which said first mentioned pivot means extends.

* * * * *